Nov. 16, 1937. J. C. STEVENS 2,099,180

LIQUID LEVEL RECORDER

Filed Oct. 14, 1935 2 Sheets-Sheet 1

Inventor
John C. Stevens

By Richard K. Stevens

Attorney

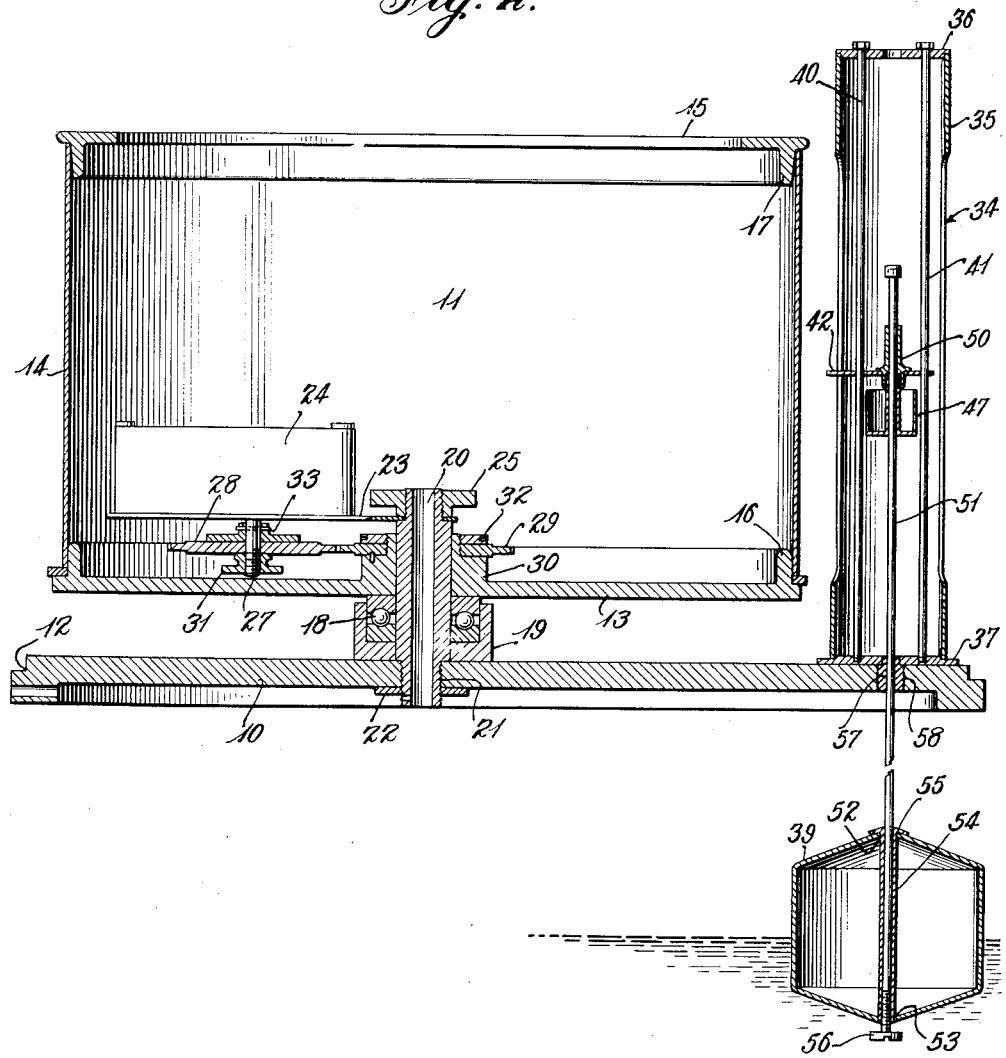

Patented Nov. 16, 1937

2,099,180

UNITED STATES PATENT OFFICE 2,099,180

LIQUID LEVEL RECORDER

John C. Stevens, Portland, Oreg., assignor to Leupold, Volpel and Company, Portland, Oreg., a corporation of Oregon Application October 14, 1935, Serial No. 44,967

2 Claims. (Cl. 234—73)

This invention relates to a liquid level recorder, and particularly to a mechanism for accurately recording the changing level of the water or other mobile liquid in models or miniature reproductions of rivers or similar bodies.

In hydraulic laboratories, such as those of the open channel type, it is customary procedure to study and carefully examine reproductions or models of rivers or the like for the purpose of learning the behavior of the prototype and the probable effect of proposed changes in topography, such as the transfer or removal of islands and bends, or the effect of projected artificial improvements, such as dams and spillways. In conducting these operations it is highly essential that all fluctuations in the level of the liquid passing through the model be accurately recorded, and it is also of great value to provide means for permitting the time scale to be quickly and efficiently changed or replaced without appreciably interrupting the operation of the recorder or the flow of liquid.

It is accordingly an object of the present invention to provide a novel and improved liquid level recorder which is capable of registering with great accuracy exceedingly small changes in the quantity of flow or level of the liquid under conditions where a relatively small range of fluctuation is commonly encountered.

A further object of the invention is to provide an apparatus for the purposes described which is capable of recording conditions graphically on any one of a variety of time scales which may be easily and interchangeably mounted.

A further object of the invention is to avoid substantially all unnecessary shaking and agitation in the parts of the apparatus which actually record the changing level of the liquid and to insure a light but continuous contact between the recording mechanism and the scale during actual use of the apparatus.

These objects and other details of the invention will be made clear by reference to the accompanying drawings, in which like numerals refer to like parts.

In the drawings,

Figure 2 is a vertical cross section through the instrument along the line 2—2 of Figure 1.

Figure 1:
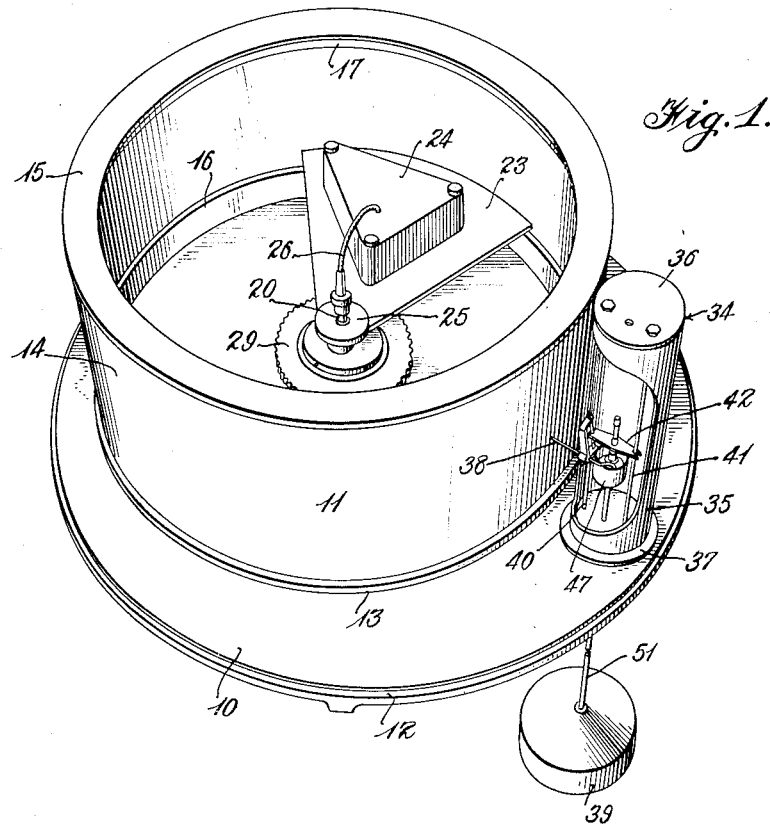
Figure 1 is a view in perspective of the assembled recorder with the outer cover removed.

10 designates a circular base which supports the recording apparatus as a whole and is adapted to be mounted and suitably leveled on a table or shelf (not shown) positioned above the water or other liquid to be measured. Base 10 accordingly constitutes a support for a chart drum, indicated generally by the numeral 11, and is rabbeted or provided with an annular groove 12 for receiving a cover for the apparatus. Chart drum 11 includes a circular base 13 of disc or plate-like formation, a chart supporting cylinder 14, preferably of thin sheet metal, and a top ring or annulus 15. The base 13 is provided with an upwardly extending annular flange 16, and the ring 15 is provided with a similar downwardly extending flange 17. These flanges receive the lower and upper edges, respectively, of the chart cylinder 14 by a sliding or friction fit. Cylinder 14 accordingly fits snugly on the flange 16 so that any rotative movement in the base plate 13 is imparted to the cylinder by friction, but at the same time the contact is sufficiently loose that the cylinder may be easily moved to any position manually without rotating the base or disc 13, thereby permitting quick and accurate adjustment for time. Top ring 15, which rotates with chart cylinder 14, tends to maintain the cylinder in its natural round shape, and, in general, lends strength to the composite drum 11.

The above described drum construction is of great value in facilitating the removal of a used or marked chart or time scale as well as the insertion or replacement of a blank chart. In addition the newly applied blank chart may be quickly adjusted for time owing to the relatively loose fit of cylinder 14 about base flange 16. Moreover, a chart drum of this construction has the further advantage of not only being easily and quickly demountable, but having sufficient strength and rigidity for the purposes of a recorder of this type.

Disc 13 constituting the base of the drum is supported by a ball thrust-bearing 18 which is suitably contained in and covered or protected by a cup-shaped member 19 resting in turn on base 10. The disc 13, thrust bearing 18 and cup 19 are all mounted coaxially with respect to a fixed hollow stud 20 about which disc 13, and hence the composite drum 11, rotate. Stud 20 is provided with screw threaded portions of reduced diameter at each end, the lower end being inserted in a suitable aperture 21 in the base 10 and being held fixedly in position by a nut 22, while the reduced portion at the upper end is adapted to receive a relatively thin plate 23 for supporting a clock 24, the plate 23 being fastened to stud 20 by a knurled nut 25. Stud 20 is made hollow so that the wires 26 for energizing the clock may be passed therethrough.

Clock 24 is preferably an electric synchronous motor clock, the movement of which imparts rotation to the shaft 27 and to the gear 28 suitably fixed to the shaft. Gear 28 meshes with a gear 29 which rests upon and is keyed to the central boss 30 on the plate or disc 13 and is also coaxial with stud 20, so that rotation of shaft 27 by mechanism 24 causes disc 13 and drum 11 to be rotated by gears 28 and 29 about the fixed stud 20. The nuts 31 and 32 keep gears 28 and 29 in alignment and hold them firmly in position, and the disc 33 keyed to shaft 27 acts as a stop member which limits the upward movement of gear 28.

Figure 3:
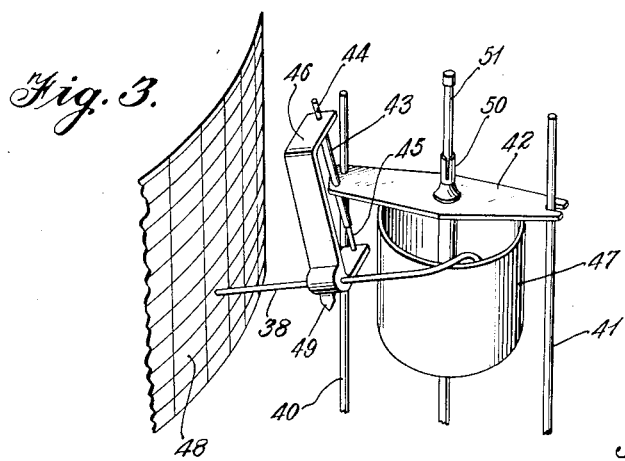
Figure 3 is an enlarged perspective view of the marking device in position adjacent the chart.

At one side of the chart drum 11 is a casing 34 for housing the float actuated marking device shown in detail in Figure 3. This casing comprises a cylinder 35 and top and bottom plates 36 and 37 and has a cut out portion on the side facing the drum to permit the marking device 38 to move upwardly and downwardly in contact with the surface of the drum according to the movement of the float 39. Parallel guide rods 40 and 41 extend vertically within the casing and are suitably fastened to the top and bottom plates 36 and 37 of the casing. Rods 40 and 41 act as a guide for the carriage plate 42 which carries or supports the pen or other marking device 38, and in addition constitute fastening means for the various parts of the casing 34.

Fixed to carriage 42 near one end is an inclined post 43 having portions of reduced diameter at each end constituting spindles 44 and 45. Post 43 is inclined toward the drum 11 with upper spindle 44 closer to the drum than lower spindle 45. A vertically disposed yoke 46 is rotatably mounted on the spindles 44 and 45 and constitutes a support for the pen 38 which is constructed and bent in such a manner that one end is always immersed in the ink contained in the reservoir 47. The other or marking end of the pen is constantly maintained contiguous to or in light radial contact with the chart 48 on the periphery of drum 11 owing to the tendency of yoke 46 to swing about post 43. In other words, the tilted arrangement of the post is such that the pen and yoke seek a position of rest at one side of the post, and since the pen and yoke are sufficiently close to the drum, the drum surface prevents the pen and yoke from reaching this position. Instead the pen tends continually to rest gently against the drum surface or chart, so that continuous contact is automatically maintained without the employment of springs or other similar devices.

A lug 49 is formed on the lower portion of the yoke for the purpose of holding the pen away from the drum, while a new chart is being substituted for a used one or during any adjustment of the chart or drum. When it is desired to renew or replace a chart, yoke 46 is merely moved upwardly by sliding it along the spindles 44 and 45 a short distance and then the yoke is rotated until the lug 49 is moved over the edge of the ink reservoir 47. The yoke may then be lowered and the pen is held by the lug away from the drum until the chart has been applied and the apparatus is ready for operation again. Yoke 46 may obviously be removed from post 43 entirely, if desired, by lifting the upper portion of the yoke off spindle 44 and then lowering the yoke until the lower portion is free of spindle 45.

Carriage plate 42 is affixed to a sliding friction collar or sleeve 50 which is mounted on the upper portion of the rod 51, so that plate 42 is moved upwardly and downwardly by rod 51 which rests upon the float 39 at its lower end and receives its motion therefrom. The ink reservoir 47 is also mounted on the upper portion of rod 51 below collar 50 and moves upwardly and downwardly with the carriage plate, collar and rod 51, as the float rises and falls. The carriage plate and ink well may be united to collar 50 by screw threading or other suitable means.

Float 39 is provided with centrally located apertures 52 and 53 in its top and bottom portions. Fitted in these apertures is a sleeve 54 which has a flange 55 on its upper end to retain the sleeve in position. A screw plug 56 is adjustably inserted within the lower end of sleeve 54, and acts as a support for the lower end of rod 51 which supports the pen, carriage plate 42, and associated parts. It is thus seen that the weight of the rod, carriage, pen, reservoir and ink bears upon the float well below its center of gravity and center of buoyancy, which is of great importance, since it insures stability of flotation and renders the effect of sudden vibrations negligible.

Rod 51 passes through the bushing or bearing 57 inserted in an aperture 58 in the base 10, and this bearing not only acts as a guide for the reciprocating rod 51 but also fastens bottom plate 37 of casing 34, and hence the casing itself, to the base 10, the bearing being provided with screw threading in its upper portion for this purpose.

In the operation of the apparatus the complete device is first mounted on a table or shelf supported a suitable distance above the body of water. Cylinder 14 is removed and a chart or time scale 48 is applied therearound which may be held in place by a strip of gummed transparent paper, cellulose tape, or similar material, or by any other suitable means. The cylinder is then slipped in place again over the flange on base plate 13, and top ring 15 is applied. The pen 38 is placed in contact with the drum surface, and the float 39 is permitted to rest upon the surface of the liquid being measured. The cylinder 14 is then adjusted to the correct time position, after which the drum 11 is set in rotation by the clock mechanism 24, and as the level of the liquid rises and falls, the combined reciprocating movement of the pen and rotation of the drum produces a time graph of the fluctuations in the level of the liquid.

The three-piece chart drum is admirably adapted to permit rapidly changing the charts or time graphs during a test run and quickly adjusting the chart for time. Extra cylinders may be kept on hand and loaded with charts in advance. Then, when it is desired to change the chart, the cylinder 14 and ring top 15 are lifted off the base 13, a new cylinder with its chart applied is placed on the base, and the top is changed over to the new cylinder. The cylinder 14 readily slips on the base 13 and the time adjustment is made by merely turning the cylinder to the desired position by hand. Thus a chart may be changed and adjusted for time without stopping the clock and only momentarily pulling the pen away.

The timing gears 28 and 29 may be interchanged or gears of different size may be employed, which permits the recording drum to be rotated at any desired speed.

In hydraulic models the float must be small and the pen must be very sensitive to slight changes in liquid levels. In accordance with the arrangement described a metal float of relatively small diameter has been found to be readily sensitive to fluctuations in the liquid level as small as 1/1000 of a foot.

It will be understood that the accompanying drawings merely represent one embodiment of the invention, and that protection is desired to cover all equivalents which may reasonably be included within the scope and spirit of the invention.

I claim:

1. In a liquid level recorder, the combination of a movable record receiving surface, marking means comprising an ink well and pen, means for supporting the pen adjacent the record receiving surface, said means being rotatably mounted on a post inclined to the vertical and being axially slidable thereon and having an element for engaging the walls of said well and retaining the pen away from said surface.

2. In a liquid level recorder, the combination of a movable record receiving surface, marking means including an ink well and pen, and means for supporting said pen comprising an inclined post and a yoke rotatably and slidably mounted on said post, said pen being in the form of a bent tube extending through said yoke and having its greater portion positioned above the surface of the ink in said well and normally having one end immersed in said ink and the other end in light contact with said surface but being movable to a position of rest with said ends away from said ink and said surface respectively.

JOHN C. STEVENS.